United States Patent Office 3,220,823
Patented Nov. 30, 1965

3,220,823
METHOD OF TREATING PLANTS AND FRUITS WITH ANTI-WILTING AGENTS
Yoshiaki Mihara, 41 1-chome Kaminakasato, Kita-ku; Tatsuo Tomioka, 1498 2-chome Yahara-cho, Nerima-ku; and Jun Kurihara, 2339 Midorigaoka, Neguro-ku, all of Tokyo, Japan
No Drawing. Filed Nov. 21, 1961, Ser. No. 154,019
Claims priority, application Japan, Nov. 22, 1960, 35/46,403
2 Claims. (Cl. 71—2.7)

The present invention relates to anti-wilting agents for plants and fruits, which coat the surfaces of plants and fruits and suppress transpiration of water from the surfaces thereof, and to a method for their application.

An object of the present invention is to inhibit wilting of plants such as the crops, seedlings of flowering and garden plants, saplings, vegetables, and fruits by means of an emulsion which is obtained by mixing an emulsifier with a normal aliphatic alcohol having 16 to 22 carbon atoms in its molecule or a mixture thereof.

A further object of this invention is to inhibit wilting of plants and fruits with an emulsion which is obtained by mixing an emulsifier with an organic compound prepared by the reaction of normal aliphatic alcohol containing 16 to 22 carbon atoms in its molecule or a mixture thereof with ethylene oxide.

Another object of this invention is to inhibit wilting of plants and fruits with an emulsion which is obtained by the reaction of normal aliphatic alcohol having 16 to 22 carbon atoms in its molecule or a mixture thereof with ethylene oxide, and then emulsified by special procedures.

For rootage of seedlings of plants or for preservation of plants and fruits, it is extremely important to inhibit wilting due to transpiration of water, and numerous methods for this purpose have been devised.

In U.S. Patent No. 1,943,468, an aqueous emulsion comprising waxy, emulsifying and resinous components is used in order to provide a natural food product with a lustrous protective coating. Further, in U.S. Patent No. 2,333,887 is described a process of protectively coating comestible products, which comprises providing such products with a readily removal non-adherent continuous film-like transparent envelope by applying thereto a concentrated colloidal solution of rubber particles and then emulsified liquid coating substances including therein a hard-drying material selected from the group of natural resins, oleo resins and ester gums. A process for the preservation of fruits has also been suggested in Japan, which comprises coating the surface of fruits with an emulsion consisting of unsaturated seven-membered cyclic organic compounds such as cyloheptatrienolone and cycloheptatrienone, and waxes.

In these hitherto known processes, however, fruits and vegetables are coated with continuous film of the respective substances and in general it is indispensable that surfaces of fruits and vegetables are smooth in order that the materials are readily settled on the surfaces. In addition, it is in many cases that what is more convenient to be used for fruits, is unsuitable for vegetables, and that the converse is same. There are various kinds of anti-wilting agents for seedlings of young plants, but they can not be used for fruits.

The present invention relates to anti-wilting agents which are useful not only for preservation of fruits and vegetables but also promoting rootage of seedlings of plants by the inhibition of wilting which occurs usually after transplantation.

The present inventors succeeded formerly in suppressing evaporation of water from water surface in paddy rice field, reservoirs and dams by spreading the product of reaction of normal aliphatic alcohol having 16 to 22 carbon atoms in its molecule with not more than 5 mols of ethylene oxide, and forming a thin film thereof on water surface (Japanese Patent No. 247,110). The said materials were then attempted to be applied to the surfaces of plants and vegetables in order to inhibit wilting due to transpiration, but it was found that these materials were poor and weak in adhesion and so inadequate for the said purpose.

The feature of the present invention lies in that normal aliphatic alcohol having 16 to 22 carbon atoms in its molecule or ethylene oxide derivatives thereof containing in the molecule not more than 5 —$CH_2$—$CH_2$—O— groups is emulsified in order to improve their adhesion.

According to the present invention, normal aliphatic alcohol containing 16 to 22 carbon atoms in its molecule or a mixture of said alcohol is melted by heating at about 100° C. and is mixed with 5 to 50% quantity by weight of an emulsifier dissolved in a suitable quantity of warm water at about 80° C. and then kneaded thoroughly, or a mixture of the alcohol and the emulsifier is melted by heating at about 100° C. previously and then kneaded with a suitable quantity of warm water at about 80° C. The emulsifier which may be used in the present invention is alkali metal salt, ammonium salt and triethanol ammonium salt of higher fatty acids having 12 to 16 carbon atoms, such as lauric, myristic and palmitic acids, and alkali metal salts of sulfuric acid ester of higher aliphatic alcohols having 12 to 16 carbon atoms, such as lauryl, myristyl and cetyl alcohols. After numerous experimental studies, it has been proved that other ordinary emulsifiers are not suitable for the purpose of the present invention. As described previously, furthermore, the alcohols used in the present invention are limited to ones that have normal saturated carbon chain and 16 to 22 carbon atoms in the molecule, that is cetanol, stearyl alcohol, eicosanol and docosanol.

In the present invention, it has been found that instead of the above mentioned alcohols, ethylene oxide derivatives which are obtained by the reaction of one mol of the said alcohol or mixture thereof and not more than 5 mols of ethylene oxide, can be used. The ethylene oxide derivatives are similarly emulsified with an emulsifier solution.

There is no limitation in the concentration of the final product, but about 40 to 50% concentration may be favourable for storage and transportation, and the dilution thereof to about 0.1 to 5.0% concentration is recommended when used.

According to this invention, furthermore, the said ethylene oxide derivatives of normal aliphatic alcohols having 16 to 22 carbon atoms in the molecule become emulsion and are useful as anti-wilting agents without being mixed with the said emulsifiers if they are emulsified in such a manner that the ethylene oxide derivatives are mixed with less than 100 times quantity of hot water and stirred in a high speed mixer. Further, it has been found that in order to produce a fine emulsion with good adhesion, it is indispensable to stir the said ethylene oxide derivatives in hot water whose temperature is higher than the melting point of the said ethylene oxide derivatives and at the same time, to stir in a mixer at speeds of more than 5,000 r.p.m. Concentration of the final emulsion in this case is favourable to be from 1 to 10%, preferably from 3 to 5%.

All kinds of the products obtained by the above mentioned methods as described previously, can be applied to most of plants as well as fruits on account of their excellent adhesion. The products adhere to the surfaces of plants and fruits.

Directions for use of the agents in the present invention are quite simple, that is, the emulsion of the agents may be sprayed on the surface of the desired plants or fruits, or these plants and fruits may be dipped in the said emulsion. In addition, it is a feature of the present invention that the coating of this agent can be readily removed by washing if necessary for eating or after transplantation.

The emulsion in the present invention covers the surfaces of the plants and fruits, and inhibits wilting by suppressing transpiration thereof but does not inhibit respiration, and thus is useful for preservation of edible products such as fruits and vegetables, and for preventing saplings or seedlings of young trees and vegetables from wilting during storage and after transplantation.

The method for the production, the composition and directions for use of the anti-wilting agents in the present invention are described in detail in the following illustrative examples.

*Example 1*

10 grms. of cetyl alcohol were melted by heating at about 100° C. and mixed with 1 grm. of potassium laurate dissolved in 1,000 ml. of warm water at 80° C. An emulsion of about 1% concentration was obtained by thorough agitation. The suppression rate of transpiration of this emulsion was measured by the following method.

Seedlings of paddy-field rice plant were dipped in the emulsion and then put in a flask which was filled almost with water. The mouth of the flask was bunged up with cotton. The amount of transpirated water was calculated by comparing the whole weight at the beginning with that after 48 hours standing. The exposed part of the seedlings was then cut off and was weighed. The transpirated amount per 1 grm. of the seedlings was obtained by dividing the weight of transpirated water by the weight of the exposed part of the seedlings. The suppression rate of transpiration was then calculated by the following formula:

$$\frac{\text{(Transpirated amount per 1 grm. of non-treated seedlings)} - \text{(Transpirated amount per 1 grm. of treated seedlings)}}{\text{(Transpirated amount per 1 grm. of non-treated seedlings)}} \times 100$$

The suppression rate of transpiration thus measured of the emulsion was 27.0%. The suppression rate of transpiration of the emulsion which was prepared in the same manner from stearyl alcohol and 10% quantity by weight of potassium laurate, and that of a mixture of equal quantity of stearyl alcohol and docosanol and 10% quantity by weight of potassium laurate, were 38.1% and 39.0%, respectively.

*Example 2*

20 grms. of monooxyethylene cetyl alcohol obtained by the reaction of one mol of cetyl alcohol and one mol of ethylene oxide, were melted by heating at about 100° C. and mixed with 6 grms. of sodium oleate dissolved in 40 ml. of warm water at 80° C. After kneading thoroughly a paste was obtained which could be stored for a long period, when used. The paste was diluted to about 1%.

The suppression rate of transpiration of this 1% emulsion measured in the same way as in Example 1 was 28.1%, and the suppression rates of transpiration of the emulsion in which instead of monooxyethylene cetyl alcohol, monooxyethylene stearyl alcohol and a mixture of equal quantity of monooxyethylene stearyl alcohol and monooxyethylene docosanol were used respectively, were 39.2% and 39.6%, respectively.

*Example 3*

A mixture of monooxyethylene stearyl alcohol and 10% quantity by weight of sodium oleate was melted by heating at about 100° C., and then added with about 30 times quantity of warm water at 80° C. and stirred.

Loquats were dipped in the emulsion thus obtained, and stored in a vessel in which the temperature was kept at 28 to 30° C. and relative humidity at 50%. After 7 days, the weight was reduced to 82% of that at the beginning, while the weight of the control which was treated with only water was reduced to 54%.

*Example 4*

In the same way as in Example 1, 0.01, 0.1, 0.5 and 1.0% emulsions were obtained from 5 parts of monooxyethylene docosanol and 1 part of sodium salt of dodecyl sulfate.

In these emulsions were dipped respectively eight lettuces and the weight thereof was respectively measured every day for 4 days. The results are shown in the following table.

|         | Before treating | | 1st day | | 2nd day | | 3rd day | |
|---------|---|---|---|---|---|---|---|---|
|         | Average Weight, grams | Exponent | Average Weight, grams | Exponent | Average Weight, grams | Exponent | Average Weight, grams | Exponent |
| 0.01%   | 28.6 | 100 | 27.1 | 95  | 22.1 | 77 | 19.1 | 67 |
| 0.1%    | 32.5 | 100 | 31.1 | 95  | 22.6 | 69 | 21.1 | 64 |
| 0.5%    | 28.9 | 100 | 28.8 | 100 | 24.1 | 83 | 22.7 | 78 |
| 1.0%    | 29.0 | 100 | 31.8 | 110 | 26.8 | 92 | 23.1 | 79 |
| Control | 29.1 | 100 | 27.0 | 95  | 22.3 | 76 | 18.7 | 64 |

*Example 5*

In the same ways as in Example 1, 0.5, 1.0, 3.0 and 5.0% emulsions were obtained from 10 parts of monooxyethylene eicosanol and 1 part of triethanol ammonium oleate.

In these emulsions were dipped respectively 20 apples, and the weight of each group was respectively measured every day for 5 days. The average decreases of each group per one apple were as follows:

|              | At beginning, gram | 1st day, grams | 2d day, grams | 3d day, grams | 4th day, grams |
|--------------|---|-----|-----|-----|-----|
| 5% Emulsion  | 0 | 1.2 | 2.0 | 3.9 | 5.0 |
| 3% Emulsion  | 0 | 1.6 | 2.7 | 5.1 | 6.4 |
| 1% Emulsion  | 0 | 1.5 | 2.5 | 5.4 | 7.3 |
| 0.5% Emulsion| 0 | 2.0 | 3.0 | 6.1 | 7.6 |
| Control      | 0 | 1.5 | 3.4 | 6.2 | 9.7 |

*Example 6*

100 grms. of monooxyethylene cetanol obtained by the reaction of one mol of cetanol and one mol of ethylene oxide were added to 3,000 ml. of boiling water and the resulting suspension was stirred for about 2 minutes in a mixer whose rotating speed was 10,000 rounds per minute.

Seedlings of paddy-field rice plants (total weight 8.5 grms. thereof) were dipped in the emulsion thus obtained (concentration; about 3%), and stored under the ordinary condition. After 30 hours, the weight was reduced to 5.6 grms. (65.8%), while the weight of the control (total weight at the beginning; 8 grms.) which was treated with only water, was reduced to 1.6 grms. (18.75%).

*Example 7*

Seedlings of paddy-field rice plants were dipped in 5% emulsion of monooxyethylene docosanol obtained in the same manner as in Example 6, and transplanted in paddy field. At 5th day, some of the non-treated seedlings were wilted at day time while the treated were not.

At 14th day after transplantation, the seedlings were plucked out of the paddy field, and the weights of the two groups were measured. The results were as follows:

|  | Weight at transplantation, grams | Weight at 14th day, grams | Ratio |
|---|---|---|---|
| Treated group | 0.43 | 1.50 | 134 |
| Non-treated group | 0.43 | 1.12 | 100 |

What is claimed is:

1. A method of treating plants and fruits in order to inhibit wilting, which comprises distributing over the surface of such plant material a 0.1 to 10% by weight aqueous emulsion the solid component of which consists essentially of 100 parts by weight of a saturated normal aliphatic alcohol containing 16 to 22 carbon atoms in its molecule and 5 to 50 parts by weight of an emulsifier selected from the group consisting of alkali metal, ammonium and triethanol ammonium salts of fatty acids having 12 to 16 carbon atoms and alkali metal salts of sulfuric acid ester of higher aliphatic alcohols having 12 to 16 carbon atoms.

2. A method of treating plants and fruits in order to inhibit wilting, which comprises distributing over the surface of such plant material a 0.1 to 10% by weight aqueous emulsion the solid component of which consists essentially of 100 parts by weight of the product of reaction of one mol of saturated normal aliphatic alcohol containing 16 to 22 carbon atoms in its molecule with not more than 5 mols of ethylene oxide, and 5 to 50 parts by weight of an emulsifier selected from the group consisting of alkali metal, ammonium and triethanol ammonium salts of fatty acids having 12 to 16 carbon atoms and alkali metal salts of sulfuric acid ester of higher aliphatic alcohols having 12 to 16 carbon atoms.

References Cited by the Examiner

Baumgartner in "New York Times," January 25, 1959, page X43, Sec. 2.

Leggett et al., Chemical Abstracts, volume 36, col. 3086 (1942).

McArthur et al., Chemical Abstracts, volume 53, column 16434 (d) (1959).

Sebba et al., Chemical Abstracts, volume 35, column 6172(9) (1941).

Suzuki et al., Chemical Abstracts, volume 53, col. 19266 (I) to 19267 (a) 1959.

LEWIS GOTTS, *Primary Examiner.*

MAURICE A. BRINDISI, *Examiner.*